(12) United States Patent
Duisenberg et al.

(10) Patent No.: US 10,235,074 B2
(45) Date of Patent: Mar. 19, 2019

(54) MANAGEMENT PROCESSOR EXECUTING PERIPHERAL DEVICE REGISTRATION SCRIPT

(71) Applicant: Hewlett Packard Enterprise Development LP, Houston, TX (US)

(72) Inventors: Kenneth C. Duisenberg, Roseville, CA (US); Justin E. York, Cypress, TX (US); Thomas Hanson, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 113 days.

(21) Appl. No.: 15/280,814

(22) Filed: Sep. 29, 2016

(65) Prior Publication Data

US 2018/0088851 A1    Mar. 29, 2018

(51) Int. Cl.
*G06F 3/06* (2006.01)
*G06F 13/10* (2006.01)
*G06F 9/50* (2006.01)

(52) U.S. Cl.
CPC ........ *G06F 3/0631* (2013.01); *G06F 3/0622* (2013.01); *G06F 3/0635* (2013.01); *G06F 3/0679* (2013.01); *G06F 9/5016* (2013.01); *G06F 13/102* (2013.01); *G06F 3/0604* (2013.01)

(58) Field of Classification Search
CPC .... G06F 9/5016; G06F 13/102; G06F 3/0631; G06F 3/0608; G06F 3/0635; G06F 3/068
See application file for complete search history.

(56) References Cited

U.S. PATENT DOCUMENTS

| 5,938,740 A | * | 8/1999 | Chang | G06F 3/002 710/15 |
| 6,662,241 B1 | * | 12/2003 | Bauer | G06F 3/0601 710/10 |
| 6,938,261 B2 | * | 8/2005 | Camara | G06F 13/102 719/321 |
| 7,865,351 B2 | * | 1/2011 | Mardiks | G06F 9/45512 703/13 |
| 8,838,838 B2 | | 9/2014 | Pao | |
| 9,208,047 B2 | | 12/2015 | Mcgraw | |

(Continued)

FOREIGN PATENT DOCUMENTS

WO    WO-2015116176    8/2015

OTHER PUBLICATIONS

"Max72420 Baseboard and Storage Management Controller", (Web Page), 2016, 2 pages.

*Primary Examiner* — Nimesh G Patel
(74) *Attorney, Agent, or Firm* — Hewlett Packard Enterprise Patent Department

(57) ABSTRACT

Various examples described herein provide for a management processor that reads a registration script from a peripheral device, and uses the script to act in proxy to register the peripheral device as a data provider on the management processor. Once a peripheral device is registered as a data provider on the management processor, the management processor can permit the peripheral device to host a management resource on the management processor. By accessing the hosted management resource through the management processor, a client can manage, monitor, or control the peripheral device.

20 Claims, 6 Drawing Sheets

(56) References Cited

U.S. PATENT DOCUMENTS

| | | | |
|---|---|---|---|
| 2004/0078583 A1* | 4/2004 | Kishimoto | G06F 3/0622 |
| | | | 713/189 |
| 2006/0095551 A1 | 5/2006 | Leung et al. | |
| 2007/0055793 A1* | 3/2007 | Huang | G06F 9/4411 |
| | | | 710/8 |
| 2007/0174033 A1* | 7/2007 | Huang | G06F 13/105 |
| | | | 703/24 |
| 2013/0297830 A1* | 11/2013 | Pao | G06F 13/102 |
| | | | 710/3 |
| 2016/0162210 A1* | 6/2016 | Bucher | G06F 3/0619 |
| | | | 711/113 |
| 2017/0322613 A1* | 11/2017 | Lin | G06F 1/3209 |

* cited by examiner

MANAGEMENT PROCESSOR EXECUTING PERIPHERAL DEVICE REGISTRATION SCRIPT

BACKGROUND

Health and status monitoring of peripheral devices faces challenges from the host computing device architecture and with respect to coupling host software and peripheral device firmware. For management processors, such as baseboard management controllers (BMCs), bus architecture may prevent a peripheral device from raising an interrupt or otherwise notifying a host computing device coupled to the peripheral device (e.g., installed within the host computing device) that an event has occurred. Additionally, host peripheral monitoring software often requires a high level of information about the peripheral devices to provide detailed/descriptive reporting. Often, this can require updating the host peripheral monitoring software whenever a peripheral device is updated.

BRIEF DESCRIPTION OF THE DRAWINGS

Certain examples are described in the following detailed description in reference to the following drawings.

DETAILED DESCRIPTION

Figure 1:
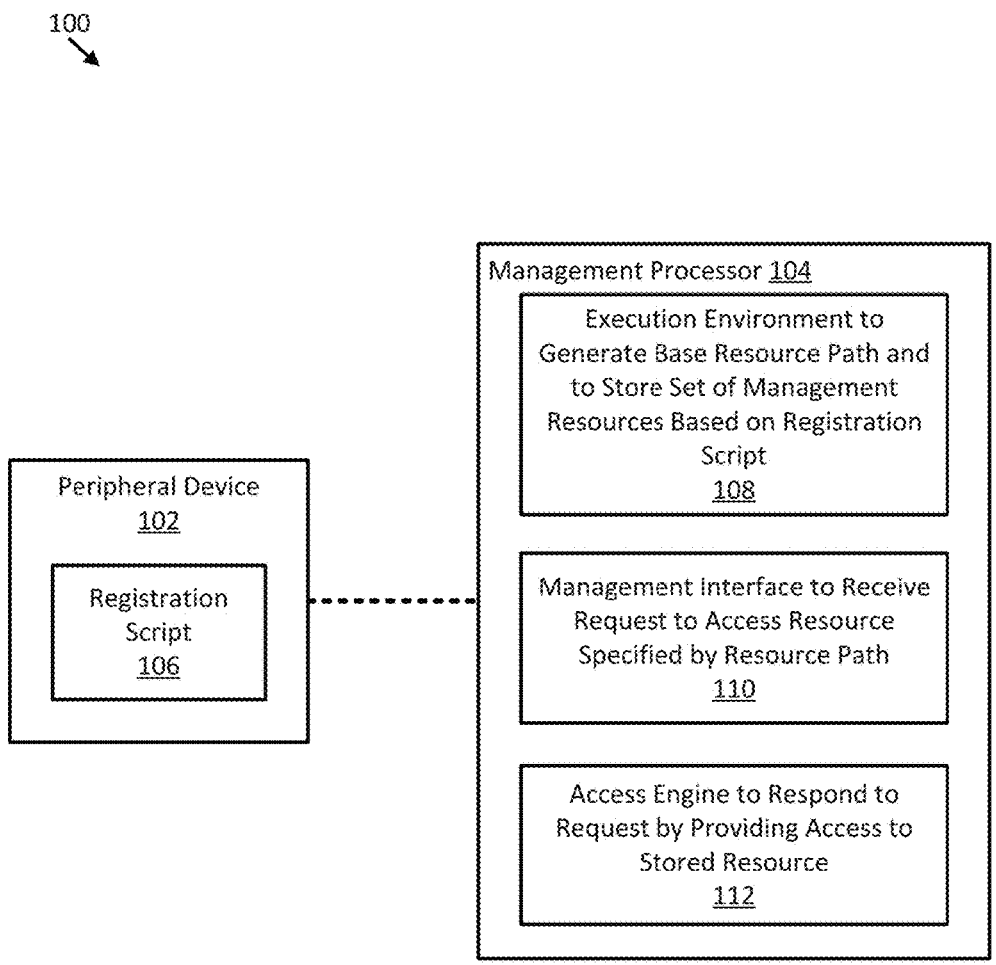
FIGS. 1 and 2 are block diagrams illustrating example illustrating example management processors according to the present disclosure.

Traditionally, a capability of a host computing device can be modified or enhanced by coupling to the computing device a set of peripheral devices, and the host can include a management processor to remotely or locally manage a set of peripherals coupled to the computing device. Management processors can include built-in logic to provide management (e.g., remote or local management) of a set of peripheral devices coupled to the computing device. Conventional management processors, such as Baseboard Management Controllers (BMCs), have been able to present a generalized view of a computing device's configuration to remote management software applications (e.g., operating on a remote computing device different from the computing device including the management processor). Conventional management processors have also been able to host data for external entities by allowing them to register as a data provider within the management processor. Through an interface of the management processor (e.g., RESTful interface), the hosted data can provide users and management tools with relevant information regarding the computer system.

However, the built-in logic of a given management processor may not reflect or use all aspects of management that are available for a given peripheral device. For instance, a management processor may be older than a peripheral device, and thus the management processor may not be capable of accessing newer technology included in the peripheral device. In another example, some management processors may include a limited amount of memory or storage for programming, and thus cannot be updated to include updated built-in logic to provide management for various peripheral devices coupled to the computing device. In yet another example, given the diversity in peripheral vendors and feature sets provided by those vendors, it may be impossible for a management processor to have hardware knowledge on all past and present peripheral devices to facilitate management and control of all those peripheral devices. As a result, it is possible for a management processor to not provide some management actions that may be available with respect to a particular peripheral device.

Further, although a conventional management processor may have basic communication layers available to get/send data with respect to a peripheral device coupled to a conventional management processor, the conventional management processor may not know how to control the peripheral device or may not know the peripheral device's management paradigm. With lack of such knowledge, the conventional management processor would not know what interface the conventional management processor should present to the world for management, monitoring, or control of the peripheral device.

Various examples described herein provide support for at least one of management, monitoring, or control of a peripheral device by a management processor (e.g., BMC) by having the management processor read data (e.g., application programming interface [API] information) from the peripheral device, and to use that data to act in proxy to register the peripheral device as a data provider on the management processor. In this way, a peripheral device may self-describe itself to a management processor such that the management processor does not require firmware updates for the peripheral device to be discovered and registered by the management processor. Once a peripheral device is registered as a data provider on the management processor, the peripheral device may inform the management processor of a set of management resources (e.g., RESTful resources) associated with the peripheral device and, in turn, the management processor may save information regarding the set of management resources to make them available for client access. At this point, the set of management resources may be regarded as registered with the management processor. Subsequently, a client can access the set of management resources (e.g., scripts, links to scripts, data tables, and data location paths to monitor values on a peripheral device) through the management processor (e.g., through an interface, such as a RESTful interface, of the management processor), which can facilitate management, monitoring, or control of the peripheral device. This interface may be accessible to a user or to remote management software applications, which may be external to the management processor (e.g., remote to the computing device that includes the management processor and the peripheral device). Use of some examples may lower research cost, development cost, testing costs, and complexity in developing a management processor. Use of some examples may also reduce the number of firmware versions a management processor vendor has to maintain to support the management processor.

For some examples, a peripheral device registration process begins by a management processor performing an initial query of a peripheral device (e.g., a network interface card [NIC]) of a computing device to discover whether the peripheral device supports the base management interface. This discovery process may be triggered in response to the management processor detecting the peripheral device coupling to the computing device. In addition, the initial query may be part of an initial query to all peripheral devices coupled to the management processor. Subsequent to the initial query, the management processor may call on a discovered peripheral device to cause a registration script from the discovered peripheral device to be loaded onto the management processor. Once loaded, the registration script may be validated by the management processor and the registration script may be executed by the management processor upon the registration script's validation. The management processor may include a generic execution environment (e.g., a Python environment) in which a script, such as the loaded registration script, can be executed within the management processor. During execution within the generic execution environment, a script may access or modify data presented on the discovered peripheral device. For some examples, the registration script causes the discovered peripheral device to be registered on the management processor as a data provider. Registrations of the discovered peripheral device as a data provider on the management processor may entail allocation of data storage for the discovered peripheral device (e.g., on the management processor), and may further entail creation of a set of links to a set of management resources of the discovered peripheral devices stored on the allocated data storage. As a data provider, the registered peripheral device can host data on the management processor, which can be accessed by a user or management software application to manage, monitor, or control the registered peripheral device.

For illustrative purposes, the following will describe a particular example in context of a peripheral device comprising a network interface card (NIC). The particular example described may be used with other peripheral devices.

For a NIC installed in a computing device, a management processor of the computing device may load a script from the NIC (e.g., import from the script from the NIC and load into memory for execution), may validate the script, and then execute the script (e.g., in an execution environment included by the management processor). The script may comprise a portion of data that facilitates or causes the NIC to be registered with the management processor as a data provider. To facilitate the registration, the script may access a link on the management processor that is associated with a registration resource on the management processor (also referred to herein as a registration link). The registration link (e.g., registration link having a resource path of "/data/Register") may be one accessed on the management processor through a management interface provided by the management processor. The management interface may comprise a RESTful interface, and may be accessible within the management processor (e.g., by scripts), and outside the management processor by an eternal entity (e.g., a user or a remote management software application).

Continuing with reference to the particular example, the script may request creation of a link for the NIC through the registration link, and may specify in the request that a specific label be included in resource path of the link (e.g., "NIC"). The script may subsequently wait for a response to the request. In response, the management processor may allocate storage space for the NIC to store data to be hosted by the management processor. The storage space may be allocated on memory (e.g., flash memory) included by the management processor or on memory external coupled to the management processor (e.g., management memory dedicated for use by the management processor). The management processor may further respond by creating a link to the allocated storage space, which the management process may return to the script (e.g., by returning to the script a resource path to the created link). The resource path of the created link may include a unique identifier to distinguish it from another peripheral device (e.g., similar peripheral device) that registers with the management processor. For instance, a first link created for the NIC may have the resource path "/data/NIC/1", while a second link created for another NIC that subsequently registers with management processor may be have the resource path "/data/NIC/2"). Example unique identifiers may comprise: a slot number corresponding to where the NIC is installed in the computing device; an incrementing index; a text string describing the slot where the NIC is installed in the computing device; or some combination thereof. The unique identifier may comprise any value that uniquely identifies one peripheral device from another peripheral device. Additionally, the unique identifier may or may not be in a human-readable format.

Continuing with reference to the particular example, the script may populate the allocated data storage space (e.g., located at "/data/NIC/1") with management resources that the management processor can use to manage, monitor, or control the registered NIC. Resources can include, without limitation, static data (e.g., in the form of a table or other data structure), or another script (or a link to the same) that the management processor can load and execute (e.g., to write data to or collect data from the registered NIC). By populating the allocated data storage space with management resources, the registration process can expose control points of the registered NIC. The following table 1 provides an example listing of management resources that may be registered with respect to the registered NIC and accessible through a RESTful interface (e.g., to a remote management software application operating on a client computing device).

TABLE 1

/rest/v1/Systems/1/NetworkAdapters/9fd725a1
/rest/v1/Systems/1/NetworkAdapters/9fd725a1/SD
/rest/v1/Systems/1/NetworkAdapters/9fd725a1/NetworkDeviceFunctions
/rest/v1/Systems/1/NetworkAdapters/9fd725a1/NetworkDeviceFunctions/80000DA97501
/rest/v1/Systems/1/NetworkAdapters/9fd725a1/NetworkDeviceFunctions/80000DA97502
/rest/v1/Systems/1/NetworkAdapters/9fd725a1/NetworkDeviceFunctions/80000DA97501/SD
/rest/v1/Systems/1/NetworkAdapters/9fd725a1/NetworkDeviceFunctions/80000DA97502/SD
/rest/v1/Systems/1/NetworkAdapters/9fd725a1/NetworkPorts/
/rest/v1/Systems/1/NetworkAdapters/9fd725a1/NetworkPorts/1
/rest/v1/Systems/1/NetworkAdapters/9fd725a1/NetworkPorts/1/SD
/rest/v1/Systems/1/NetworkAdapters/9fd725a1/NetworkPorts/2
/rest/v1/Systems/1/NetworkAdapters/9fd725a1/NetworkPorts/2/SD For illustrative purposes, the following table 2 provides an example listing of management resources that may be registered with respect to a registered graphics processor unit (GPU) and accessible through a RESTful interface.

TABLE 2

/rest/v1/Systems/1/GPU/1/
/rest/v1/Systems/1/GPU/1/SD
/rest/v1/Systems/1/GPU/1/ThreadController/1
/rest/v1/Systems/1/GPU/1/ThreadController/2

TABLE 2-continued

/rest/v1/Systems/1/GPU/1ThreadController/3
/rest/v1/Systems/1/GPU/1/ThreadController/4
/rest/v1/Systems/1/GPU/1/ThreadController/1/SD
/rest/v1/Systems/1/GPU/1/ThreadController/2/SD
/rest/v1/Systems/1/GPU/1/ThreadController/3/SD
/rest/v1/Systems/1/GPU/1/ThreadController/4/SD Continuing with reference to the particular example, the management processor can maintain integrity of the data provider connection established between the registered NIC and the management processor. For instance, before a script is executed by the management processor, the management processor may validate that the script loaded from the registered NIC is actually associated with the registered NIC. In another instance, a script loaded from the registered NIC and executed by the management processor may only be permitted to populate the allocated data storage, or restrict access data from the allocated data storage. The management processor may achieve this by storing the resource path to the link created for the registered NIC by the management processor, and to use the stored resource path to validate all access of allocated data storage space by the script being executed by the management processor. In particular, the script may be required to provide the resource path of the allocated data storage space to the management processor before the management processor may permit the script to read from or write to the allocated data storage, and the management processor may block the script's access of the allocated data storage space if another resource path is provided to the management processor. The management processor may also restrict access of the allocated data storage space by the script by ensuring that a unique identifier (e.g., "1") included in the resource path (e.g., "data/NIC/1") to the allocated data storage space for the registered NIC is correlated with the registered NIC. The resource path to the created link may be stored by the management processor in a memory area inaccessible to the script loaded from the registered NIC. To provide further data provider integrity, an association between the stored resource path and the script may also be stored and used by the management processor to validate the script, and this association may also be stored in a memory area inaccessible to the script. In this way, the script (and possibly any other script loaded from a peripheral device) can be prevented from accidentally or maliciously modifying the stored resource path or the stored association used in maintaining the integrity of the data provider connection between the registered NIC and the management processor.

In another instance, a script loaded from the registered NIC and executed by the management processor may only access the registered NIC from which the script was loaded. The management processor may do so by storing a unique identifier derived from a set of attributes of the registered NIC (e.g., combination of two or more of a serial number, a bus address, and that the type of peripheral device is a NIC), and may use the stored unique identifier to validate data communication between the script and the registered NIC and block any attempts by the script to access another peripheral device. Additionally, the management processor may use the stored unique identifier to validate a script (e.g., a script to perform a management or monitoring function with respect to the peripheral device) before the script is permitted access to data storage space allocated by the management processor for the peripheral device associated with the stored unique identifier. The derived unique identifier may be stored by the management processor in a memory area inaccessible to the script loaded from the registered NIC. In this way, the script (and possibly any other script loaded from a peripheral device) can be prevented from accidentally or maliciously modifying the stored unique identifier used to maintain the integrity of the data provider connection between the registered NIC and the management processor.

In another instance, a script loaded from the registered NIC may only be executed by the management processor once the loaded script is validated by the management processor based on a digital signature included with the loaded script. Through digital signature validation, the management processor may confirm that the origin of the loaded script is a trusted source, and may further confirm that the loaded script is associated with the peripheral device from which it was loaded. The digital certificate used to sign a script loaded from a peripheral device can vary between examples. For instance, the digital certificate used to sign the script may be one associated with: a vendor or manufacturer of the peripheral device; a vendor or manufacturer of the management processor, a vendor or manufacturer of the computing device that includes the management processor a firmware developer of the peripheral device or the management processor, or the peripheral device itself (e.g., digital certificate exclusively associated with this specific peripheral device).

In another instance, for a script loaded from the registered NIC and executed by the management processor, the management processor may track various attributes of the loaded script, such as the loaded script's execution or the loaded script's attempt to access the allocated storage space. In some instances, if a predefined threshold value is exceeded, the management processor may disable execution of the loaded script. In additional instances, repeated disabling of the loaded script can result in the script being blacklisted by the management processor, or the associated peripheral device (i.e., the registered NIC) or its type of peripheral device (i.e., all NICs) being blacklisted by the management processor. The management processor may block blacklisted scripts from being loaded, and may block scripts from being loaded from blacklisted peripheral devices. Blocking scripts being loaded from blacklisted peripheral devices may also prevent blacklisted peripheral devices from being registered by the management processor in the future. The list of blacklisted scripts or blacklisted peripheral devices may be stored by the management processor in a memory area inaccessible to a script loaded from a peripheral device.

Through the management processor, client access to a specific management resource in the set of management resources may be restricted by access control implemented by the management processor. In particular, an individual management resource may be associated with an access permission, which may be enforced by the management processor when servicing a client request (e.g., received through a management interface) to access a management resource registered with the management processor. The association between an access permission and an individual management resource may be stored by the management processor at the time of the management resource's registration with the management processor (e.g., during registration of the related peripheral device with the management processor) or at some point afterward (e.g., access permission manually set by an administrative user of the management processor). For instance, a registration script of a peripheral device may provide (e.g., declare) access permissions for individual management resources in the set of management resources being registered with the management processor for the peripheral device. Depending on the example, an association between an access permission and an individual management resource may be stored by the management processor in a memory area inaccessible to a client. Additionally, an access permission of a management resource may include role-based restrictions, whereby the role of a user (e.g., username) associated with a client access request determines whether the management processor will provide access to the management resource. For instance, access to a management resource of relating to the configuration of a network interface controller (NIC) may be restricted to "administrator" users, while access to another management resource relating to the status of same NIC is restricted to "administrator", "server operator", "network operator" users. Examples of roles can include, without limitation, administrator, superuser, regular user, server operator, network operator, or storage operator.

Continuing with reference to the particular example, the management processor can receive from a client computing device (e.g., a remote management software application operating on the client computing device) a request to access a resource registered on the management processor with respect to the registered NIC. As described herein, a client computing device may manage, monitor, or control the registered NIC by way of accessing a resource registered on the management processor in connection with the registered NIC. Each of the registered resources may be stored on allocated data storage space corresponding to the resource path generated for the registered NIC ("/data/NIC/1").

Accordingly, for a request from the client computing device to access a registered management resource specified by a resource path (e.g., "/data/NIC/1/NetworkDeviceFunctions/80000DA97501") comprising the registered NIC's generated resource path ("/data/NIC/1"), the management processor can translate the request such that the client computing device is provided with access to the registered management resource of the registered NIC specified in the request. In instances where the registered management resource is data stored on the management processor, the management processor can return the data to the client computing device. In instances where the registered resource is a script or a link to a script stored on the registered NIC, the management processor can execute the script, which may cause data to be read from or written to the registered NIC.

With respect to deregistering the registered NIC from the management processor, the management processor may utilize a unique identifier derived from a set of attributes of the registered NIC and stored by the management processor (e.g., on a memory area inaccessible to a script loaded from a peripheral device). For instance, the management processor may automatically deregister the registered NIC in response to the management processor determining that a peripheral device having a unique identifier matching the stored unique identifier is no longer present in the computing device. In another instance, the management processor may automatically deregister the registered NIC in response to the management processor detecting that the unique identifier being derived based on the registered NIC has changed.

As used herein, a computing device can comprise a desktop, laptop, workstation, server (e.g., rack-mount server), or other device that operates by a processor, which may include an enclosure to house a peripheral device coupled to the computing device. As used herein, a management processor can include a hardware processor that is dedicated to management of the computing device, and that can execute in a separate or isolated manner from the main processor of the computing system. An example of a management processor can include a baseboard management controller (BMC), which is a specialized microcontroller embedded on a motherboard of a computing device such as a server. A BMC can support the Intelligent Platform Management Interface (IPMI) architecture, which defines a set of common interfaces to computer hardware and firmware that system administrators can use to monitor health and manage a computing device. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

As used herein, a script comprises a file or a set of files that includes code written in an interpreted programming language (e.g., scripting language, such as Python, Perl, or JavaScript) and executable within an execution environment (e.g., a runtime environment that supports execution of the scripting language). Additionally, as used herein, execution of a script can comprise execution of some or all of the script. By a set of script functions, a script may: facilitate registering a peripheral device as a data provider on a management processor; facilitate deregistering a peripheral device registered on the management processor as a data provider; implement peripheral device monitoring or management functionality on the management processor, or some combination thereof.

For some examples, the execution environment utilized for executing the script is included by a management processor. For some examples, the script can include code written in a non-scripting programming language that is compilable into machine code executable by a management processor. As described herein, by importing a script from a peripheral device, a management processor can import logic directly from the peripheral device and utilize the imported logic to perform registration of a peripheral device as a data provider on a management processor deregistration of a peripheral device registered on the management processor as a data provider; a monitoring or management function with respect to the peripheral device; or some combination thereof.

For some examples, a script utilizes a peripheral-generic functionality provided by a support library accessible to the script through execution environment. For instance, a script may utilize a peripheral-generic functionality from the support library that converts a monitor value obtained from a peripheral device register into a value presentable in an analysis (e.g., a monitoring report) of peripheral device, such as a temperature or a data flow rate. Similarly, a script can utilize a protocol translator (e.g., ASN.1, JSON, and XML) from the support library to translate a data structure included by a monitor value obtained from a peripheral device. Such conversions and translations can be performed before an obtained monitor value is provided to another entity (e.g., remote management software application) by the management processor (e.g., through a management interface such as a RESTful interface). In another instance, a script can utilize an arithmetic operation (e.g., standard deviation, variance, mean, mode) or a line or curve fitting function from the support library to analyze a trend with respect to a set of monitor values obtained from the peripheral device.

As used herein, a peripheral device can include a modular computing device component of a computing device (e.g., laptop, desktop, server, or smartphone), which can couple to the computing device through a data interface of the computing device. A peripheral device may couple to a computing device internally (e.g., to a data bus slot or interface within the housing of the computing device) or externally, such as through an external input/out (I/O) interface (e.g., Universal Serial Bus [USB]). Once coupled to a computing device, the peripheral device can be considered installed with respect to the computing device and a management processor of the computing device can communicate with the peripheral device as disclosed herein. Example peripheral devices can include, without limitation, network interface cards (NICs), user input devices, storage devices, storage adapters (e.g., host bus adapters [HBAs]), display adapters, and sensors.

Additionally, as used herein, modules and other components of various examples may comprise, in whole or in part, hardware (e.g., electronic circuitry), or a combination of hardware and programming (e.g., machine-readable instructions, such as firmware), to implement functionalities described herein. For instance, a module may comprise a combination of machine-readable instructions, stored on at least one non-transitory machine-readable storage medium, and at least one processing resource (e.g., controller) to execute those instructions. The machine-readable instructions may comprise computer-readable instructions executable by a processor to perform a set of functions in accordance with various examples described herein. In another instance, a module may comprise electronic circuitry to perform a set of functions in accordance with various examples described herein.

The following provides a detailed description of examples illustrated by FIGS. 1-6.

FIG. 1 is a block diagram illustrating an example illustrating example management processor 104 according to the present disclosure. In accordance with some examples, the management processor 104 implements peripheral device registration as described herein. FIG. 1 illustrates a computing environment 100 (e.g., a computing device) in which a peripheral device 102 is coupled to the management processor 104. Depending on the example, the peripheral device 102 may couple to the management processor 104 over a wired data path, which may be implemented by a data bus (e.g., Peripheral Component Interconnect [PCI], Peripheral Component Interconnect Express [PCIe], or System Management Bus [SMBus]) included in the computing environment 100. Alternatively, for some examples, the management processor 104 couples to the peripheral device 102 over a wireless data path within the computing environment 100. In various examples, the components or the arrangement of components in the peripheral device 102 or the management processor 104 may differ from what is depicted in FIG. 1.

In FIG. 1, the peripheral device 102 includes a registration script 106, which may be stored on a non-volatile data storage device (e.g., flash memory or the like) included by the peripheral device 102. The non-volatile data storage device (not shown) of the peripheral device 102 may be one that the peripheral device 102 uses to store its firmware. As noted herein, the peripheral device 102 can include, without limitation, a network interface card (NIC), a sensor, a storage device, a storage adapter, a display adapter, or the like. The peripheral device 102 may communicate with the management processor 104 over a data bus, which the peripheral device 102 may couple to through a data bus interface (e.g., peripheral device slot).

The management processor 104 includes an execution environment 108, a management interface 110, and an access engine 112. According to some examples, the execution environment 108 to execute the registration script 106 after the management processor 104 has imported the registration script 106 from the peripheral device 102. For some examples, based on the execution of the imported registration script 106 in the execution environment 108, the management processor 104 generates a base resource path in association with data storage space allocated for the peripheral device 102, and stores a set of management resources associated with the peripheral device 102. For some examples, the base resource path comprises a Universal Resource Locator (URL). As noted herein, the base resource path may uniquely identify the peripheral device 102 over any other peripheral device coupled to the management processor 104. Depending on the example, the base resource path can include a set of identifiers relating to attributes of the peripheral device 102. Example attributes can include, without limitation, a type, a class, a vendor, a manufacturer, a model, a serial number, a bus address, or some combination thereof, of the peripheral device 102. The set of management resources stored on the allocated data storage space may be regarded as a set of registered management resources for the peripheral device 102. As described herein, the stored set of management resources is accessed by a client computing device to perform a management, monitoring, or control function with respect to the peripheral device 102.

Some or all of the set of management resources may be received from the peripheral device 102. Examples of management resources can include, without limitation: a script (e.g., for performing a management or a monitoring function with respect to the peripheral device 102); a link to a script (e.g., a management or monitoring script stored on the peripheral device 102); a non-executable descriptive data (e.g., static management data associated with the peripheral device 102, such as a data table listing available actions for or attributes of the peripheral device 102); a data location path for a monitor value on the peripheral device 102; a data type for the monitor value; a data size for the monitor value (e.g., number of bytes); and a display format type for the monitor value. Non-executable descriptive data may be structured according various protocols, such as ASN.1, XML, or JSON.

By executing the imported registration script 106 within the execution environment 108, the peripheral device 102 can register as a data provider on the management processor 104 and, as a data provider, the peripheral device 102 can host data on the management processor 104. Through this hosted data, the management processor 104 can facilitate management of the peripheral device 102, monitoring of the peripheral device 102, control of the peripheral device 102, or some combination thereof. The hosted data may permit the peripheral device 102 to self-describe itself to the management processor 104, and share information regarding the peripheral device 102 with the management processor 104.

The management processor 104 may include a peripheral script importer (now shown) to import a script from the peripheral device 102. During the importation process, the peripheral script importer may request the peripheral device 102 upload the registration script 106 to the management processor 104, and the peripheral device 102 may respond accordingly. The management processor 104 may store the registration script 106 in a non-volatile data storage device (not shown), which may be included by the management processor 104. To facilitate importation of a script or non-executable data from the peripheral device 102 to the management processor 104, the peripheral device 102 of some examples may implement logic or a protocol (e.g., peripheral device management protocol) that enables the peripheral device to store data, such as a script or descriptive data, as part of the peripheral device 102 (e.g., as part of its firmware). For some examples, the logic or the protocol permits the peripheral device 102 to provide (e.g., upload) the data to the management processor 104, and may do so in response to the management processor 104 requesting the script or descriptive data from the peripheral device 102. An example protocol on a peripheral device that may permit such importation can include, without limitation, Discovery and Configuration via iLO (DCi) developed for INTEGRATED LIGHTS-OUT, a management processor offered by HEWLETT PACKARD ENTERPRISE.

The management processor 104 may allocate the data storage on memory (e.g., non-volatile data storage device, such as flash memory) accessible to the management processor 104. The memory may be included as part of the management processor 104. The management processor 104 may allocate the data storage as part of executing the imported registration script 106, and the allocated data storage space is allocated exclusively to the peripheral device 102.

The registration script 106 stored on the peripheral device 102 may be uniquely associated with the peripheral device 102, uniquely associated with (e.g., applicable to) the make and model of the peripheral device 102, or uniquely associated with (e.g., applicable to) the class of peripheral device for the peripheral device 102. For instance, where the peripheral device 102 is a network interface card (NIC), the registration script 106 may comprise a script related to registering all NICs with the management processor 104, or a script uniquely configured to register a certain make and model of the NIC with the management processor 104.

The execution environment 108 included by the management processor 104 may support execution of one or more interpreted programming languages (e.g., scripting languages) used in a registration script, or other scripts, imported from the peripheral device 102. During operation, the management processor 104 can execute the registration script 106 within the execution environment 108, which can cause the management processor 104 to register the peripheral device 102 with the management processor 104 as a data provider, as described herein. For some examples, the execution environment 108 comprises a Python runtime environment, and the registration script 106 may comprise Python code. Additionally, for some examples, the execution environment 108 includes a plurality of runtime environments to support different types of scripts (e.g., written in different programming languages). The execution environment 108 may be one shared with other functionality hosted on the management processor 104, such as device discovery and configuration functionality. In various examples, the execution environment 108 is configured (e.g., modified) to restrict access to a subset of functionality provided by the execution environment 108. For instance, the execution environment 108 may be configured such that scripts executing in the execution environment 108 have restricted (or no) access to files, to non-essential operating system calls, or to system resources. In this way, the execution environment 108 can operate as a security sandbox in which a script imported from the peripheral device 102, such as the registration script 106, can securely execute.

The management interface 110 included by the management processor 104 may receive, from a client computing device, a request to access a resource specified by a resource path included in the request. The resource path specified in the request can include the base resource path generated based on the registration script 106 when the peripheral device 102 registered with the management processor 104. The resource for which the client computing device is requesting access may be in the set of management resources on the allocated data storage space, which was stored when the peripheral device 102 registered with the management processor 104. The management interface 110 may comprise a RESTful interface that is implemented by the management processor 104, and which may enable the management processor to provide a RESTful service to service RESTful requests. For such instances, the management interface 110 can receive a request from a client (e.g., client software application or client computing device) and can provide a response to the response to the client using a set of methods supported by a RESTful service (e.g., GET, POST, and PUT). The management interface 110 may facilitate communication between a remote management software application and the management processor 104. For instance, through the management interface 110, the management processor 104 can raise an alarm, send an alert, or report an event or condition (e.g., discovered by an executed script relating to management or monitoring) to a remote management software application. An alarm, an alert, or a report can include data (e.g., error or debug code) that supports the alarm, alert, or report.

In response to a request from a client computing device to access a resource specified by a resource path included in the request, the access engine 112 included by the management processor 104 may provide the client computing device with access to the resource as stored on the allocated data storage space corresponding to the resource path. For some examples, the access engine 112 provides access to the resource requested through the management interface 110. Where the requested resource relates descriptive data (e.g., data table or a link to a data table), the access engine 112 may provide access to the resource by sending the descriptive data to the client computing device (e.g., through the management interface 110). Where the requested resource relates to a script (e.g., script stored on the management processor 104) or a link to a script on the peripheral device, the access engine 112 may provide access to the resource by causing the management processor 104 to load and execute the script within the execution environment 108. Where data output is produced by the executed script relating to the resource, the access engine 112 may return the produced data output to the client computing device (e.g., through the management interface 110). Accordingly, by receiving a client request to access a management resource through the management interface 110 and responding to the request by the access engine 112, the management processor 104 can: facilitate client access to data (e.g., stored on the management processor 104 or the peripheral device 102) regarding the peripheral device 102; translate the client request to call a script to perform a data read/write with respect to the peripheral device 102; or both.

Figure 2:
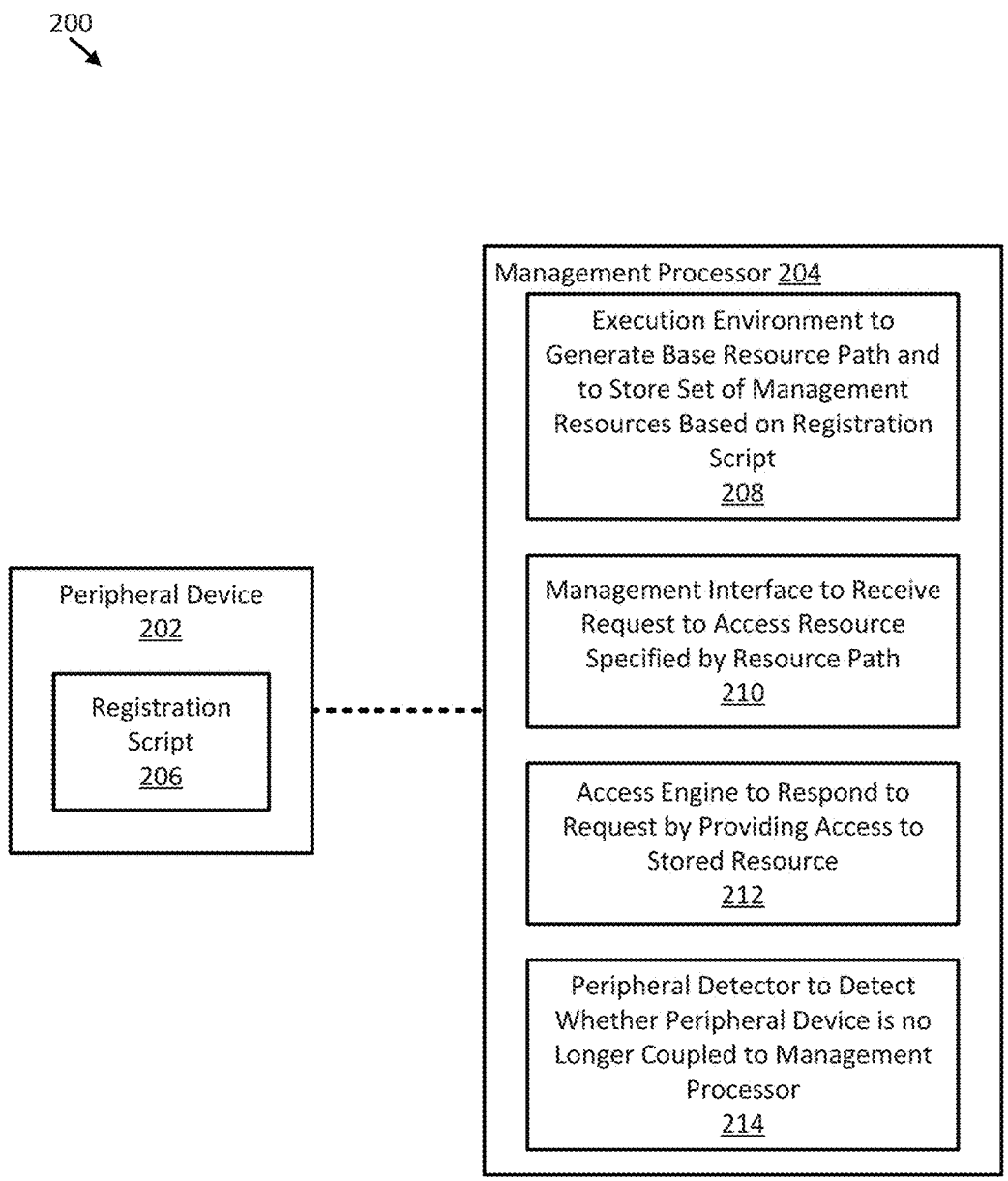

FIG. 2 is a block diagram illustrating an example management processor 204 according to the present disclosure. In accordance with some examples, the management processor 204 implements peripheral device registration as described herein. FIG. 2 illustrates a computing environment 200 (e.g., a computing device) in which a peripheral device 202 is coupled to the management processor 204. Depending on the example, the peripheral device 202 may couple to the management processor 204 over a wired data path, which may be implemented by a data bus (e.g., Peripheral Component Interconnect [PCI], Peripheral Component Interconnect Express [PCIe], or System Management Bus [SMBus]) included in the computing environment 200. Alternatively, for some examples, the management processor 204 couples to the peripheral device 202 over a wireless data path within the computing environment 200. In various examples, the components or the arrangement of components in the peripheral device 202 or the management processor 204 may differ from what is depicted in FIG. 2.

For some examples, the peripheral device 202 may be similar to the peripheral device 102 of the computing environment 100 described above with respect to FIG. 1. In FIG. 2, the management processor 204 includes an execution environment 208, a management interface 210, an access engine 212, and a peripheral detector 214. According to various examples, the execution environment 208, the management interface 210, and the access engine 212 are respectively similar to the execution environment 108, the management interface 110, and the access engine 112 of the management processor 104 described above with respect to FIG. 1.

The peripheral detector 214 may detect whether the peripheral device 202 is no longer coupled to the management processor 204 and cause the base resource path to be disassociated from the peripheral device in response to the peripheral device 202 not being detected. Additionally, peripheral detector 214 may detect whether the peripheral device 202 is no longer coupled to the management processor 204 and cause the allocated data storage space to be deallocated. For some examples, deallocation of the allocated data storage space involves erasing some or all of the allocated data storage space. Once deallocated for the peripheral device 202, the data storage space may be reallocated for another peripheral device, which may subsequently register with the management processor 204 as a data provider.

Figure 3:
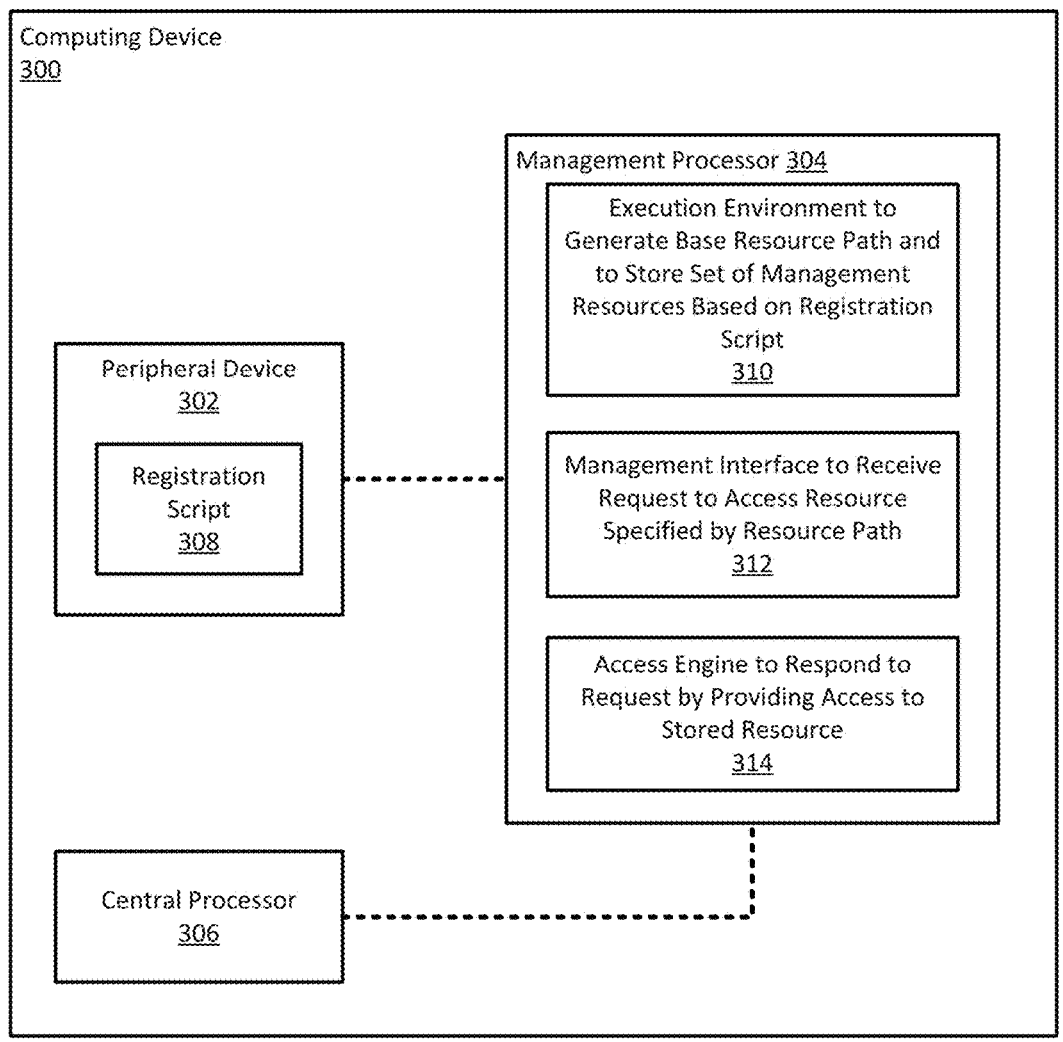
FIG. 3 is a block diagram illustrating an example computing device including an example management processor according to the present disclosure.

FIG. 3 is a block diagram illustrating an example computing device 300 including an example management processor according to the present disclosure. As shown, the computing device 300 includes a peripheral device 302, a management processor 304, and a central processor 306 coupled to the management processor 304. As described herein, the computing device 300 can comprise a desktop, laptop, workstation, server, or other device that operates by a processor, which may include an enclosure to house a peripheral device 302 coupled to the computing device 300. Depending on the example, the peripheral device 302 may couple to the management processor 304 over a wired data path, which may be implemented by a data bus (e.g., Peripheral Component Interconnect [PCI], Peripheral Component Interconnect Express [PCIe], or System Management Bus [SMBus]) included in the computing device 300. Alternatively, for some examples, the management processor 304 couples to the peripheral device 302 over a wireless data path within the computing device 300. In various examples, the components or the arrangement of components in the peripheral device 302 or the management processor 304 may differ from what is depicted in FIG. 3.

For some examples, the peripheral device 302 is similar to the peripheral device 102 of the computing environment 100 described above with respect to FIG. 1. In FIG. 3, the management processor 304 includes the execution environment 310, the management interface 312, and the access engine 314. For some examples, the execution environment 310, the management interface 312, and the access engine 314 are respectively similar to the execution environment 108, the management interface 110, and the access engine 112 of the computing environment 100 described above with respect to FIG. 1.

The central processor 306 can include a central processing unit (CPU) of the computing device 300. For some examples, the central processor 306 is utilized by the computing device 300 to operate an operating system (OS) or a software application. For instance, the software application can include a server management software application that can manage, monitor, or control the peripheral device 302 (or another peripheral device) through the management interface 312 of the management processor 304. As illustrated in FIG. 3., the central processor 306 is separate and distinct from the management processor 304.

Figure 4:
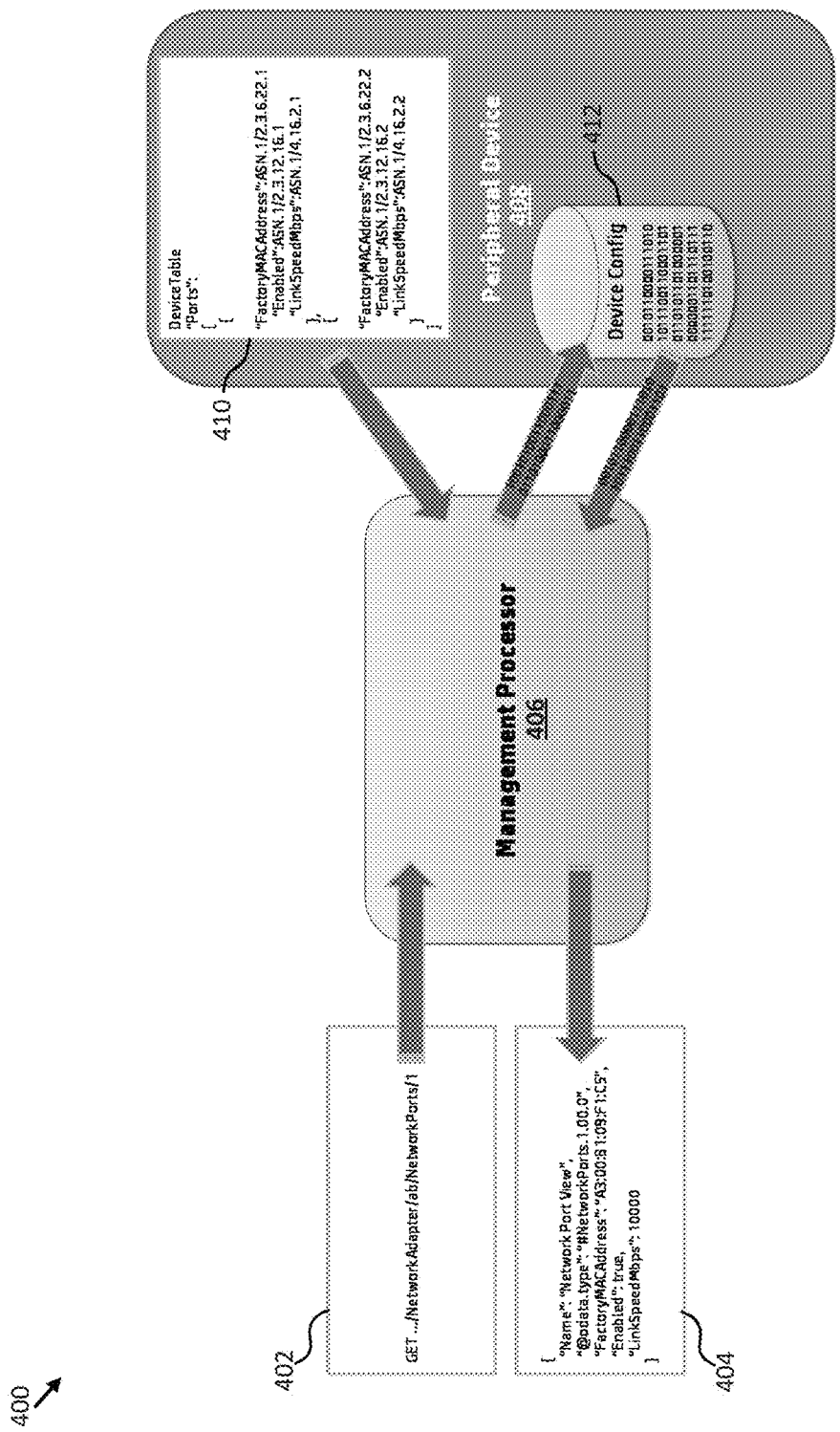
FIG. 4 is a flow diagram illustrating operation of an example management processor according to the present disclosure.

FIG. 4 is a flow diagram 400 illustrating operation of an example management processor 406 according to the present disclosure. FIG. 4 includes a management processor 406 and a peripheral device 408 coupled to the management processor 406. For some examples, the management processor 406 and the peripheral device 408 are respectively similar to the management processor 104 and the peripheral device 102 of the computing environment 100 described above with respect to FIG. 1.

As shown in FIG. 4, the management processor receives a request 402 and provides a response 404, which may be in response to the request 402. The request 402 comprises a Hypertext Transport Protocol (HTTP) GET request with a resource path of " . . . /NetworkAdapter/ab/NetworkPorts/1." The response 404 comprises JavaScript Object Notation (JSON) data that describes attributes of the peripheral device 408. The request 402 may comprise a RESTful request, and the response 404 may comprise a RESTful response.

As described herein, the peripheral device 408 may register with the management processor 406, which may include a set of management resources (e.g., RESTful resources) of the peripheral device 408 to be registered with the management processor 406. The management processor 406 may make the registered set of management resources available to a client to access to manage, monitor, or control the peripheral device 408 through the management processor 406. As part of the registration process as described herein, the management processor 406 may import "DeviceTable" data 410 (e.g., JSON data) stored on the peripheral device 408. Through the management processor 406, a client can request a management or control function (e.g., the request 402) be performed with respect to the peripheral device 408. A request received by the management processor 406 may: cause device configuration data 412 stored on the peripheral device 408 to be read by the management processor 406; cause the device configuration data 412 to be modified by the management processor 406; or some combination of both.

According to various examples, by servicing client requests for the peripheral device 408, the management processor 406 functions as an intelligent pass-thru for client requests to manage, monitor, or control the peripheral device 408. In particular, once the peripheral device 408 is registered with the management processor 406, the management processor 406 can service the request 402 and the like (e.g., RESTful requests) for the peripheral device 408 based on the set of management resources registered on the management processor 406 for use with the peripheral device 408. In servicing the request 402, the management processor 406 may respond by obtaining data from the peripheral device 408 (e.g., the device configuration data 412) and including that obtained in the response 404. In providing data from the peripheral device 408 to a client, the management processor 406 may convert data (e.g., between types or data formats) it obtains from the peripheral device 408. For instance, data provided by the peripheral device 408 may be in ASN.1 format and the management processor 406 may convert such data to a JSON format before the data is included in the response 404. Such a conversion may be facilitated by a management resource registered on the management processor 406 for the peripheral device 408. The registered management resource may comprise a peripheral device management script (hereafter, management script) that is executed by the management processor 406 (e.g., in response to the request 402), that obtains data from the peripheral device 408, that converts the data (e.g., between types, formats, or units), and generates a response that includes the resulting converted data.

Figure 5:
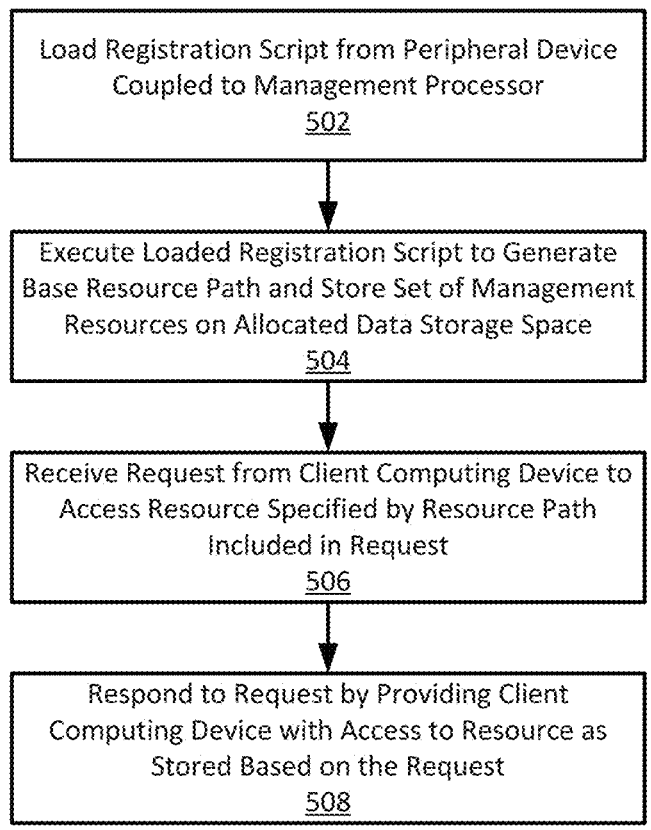
FIGS. 5 and 6 are flow diagrams illustrating example methods for registering a peripheral device to an example management processor according to the present disclosure.

FIG. 5 is a flow diagram illustrating an example method 500 for registering a peripheral device to an example management processor according to the present disclosure. In particular, the method 500 may be performed by a management processor, such as the management processor 104 or a baseboard management controller (BMC) included by a computing device (e.g., server). In accordance with some examples, the method 500 facilitates registering the peripheral device 102 with the management processor 104 as a data provider. As described herein, once the peripheral device 102 is registered with the management processor 104, the management processor 104 may provide at least one of management, monitoring, or control of the peripheral device 102 through an interface (e.g., RESTful interface) implemented by the management processor 104. Although execution of the method 500 is described below with reference to the management processor 104 of FIG. 1, execution of the method 500 by other suitable systems or devices, including remotely networked devices, may be possible. The method 500 may be implemented in the form of executable instructions stored on a machine-readable medium (e.g., firmware) or in the form of electronic circuitry.

In FIG. 5, the method 500 may begin at block 502, with the management processor 104 loading a registration script from a peripheral device 102 coupled to the management processor. The method 500 may continue to block 504, with the management processor 104 executing the registration script loaded at block 502. For some examples, execution of the loaded registration script by the management processor 104 causes the management processor 104 to generate a base resource path in association with data storage space allocated for the peripheral device 102. Additionally, for some examples, execution of the loaded registration script by the management processor 104 causes the management processor 104 to store a set of management resources on the allocated data storage space. The set of management resources may be associated with the peripheral device 102 and may be received (e.g., by the management processor 104) from the peripheral device 102. For some examples, the peripheral device 102 is considered registered as a data provider on the management processor 104 as a result of the loaded registration script being executed by the management processor 104. Additionally, registration of the peripheral device 102 as a data provider may be accomplished before the loaded registration script ceases to be executed by the management processor 104.

The method 500 may continue to block 506, with the management processor 104 receiving, from a client computing device (e.g., one operating remote management software application), a request to access a resource specified by a resource path included in the request. The resource requested may be one included in the set of management resources stored on the allocated data storage space at block 504. According to various examples, the management processor 104 will respond based on whether the resource path included in the request includes a base resource path associated with the peripheral device 102 (e.g., generated at block 504) or some other peripheral device registered with the management processor 104.

The method 500 may continue to block 508, with the management processor 104 responding to a request from client computing device to access a resource specified by a resource path included by the request. Based on the request, the management processor 104 may or may not respond to the request by providing the client computing device access to the resource. Where the resource path of the request includes the base resource path associated with the peripheral device 102 (e.g., generated at block 504) and the resource specified is one included in the set of management resources stored on the allocated data storage space (e.g., at block 504), the management processor 104 can respond to the request by providing the client computing device with access to the resource. Where the resource path of the request does not include the base resource path of the peripheral device 102 (or of another peripheral device), the management processor 104 may respond to the client computing device with an error response, or may not respond at all. Where the resource path of the request specifies a resource that is not stored on the allocated data storage space associated with the base resource path included in the resource path, the management processor 104 may respond to the client computing device with an error response, or may not respond at all.

Figure 6:
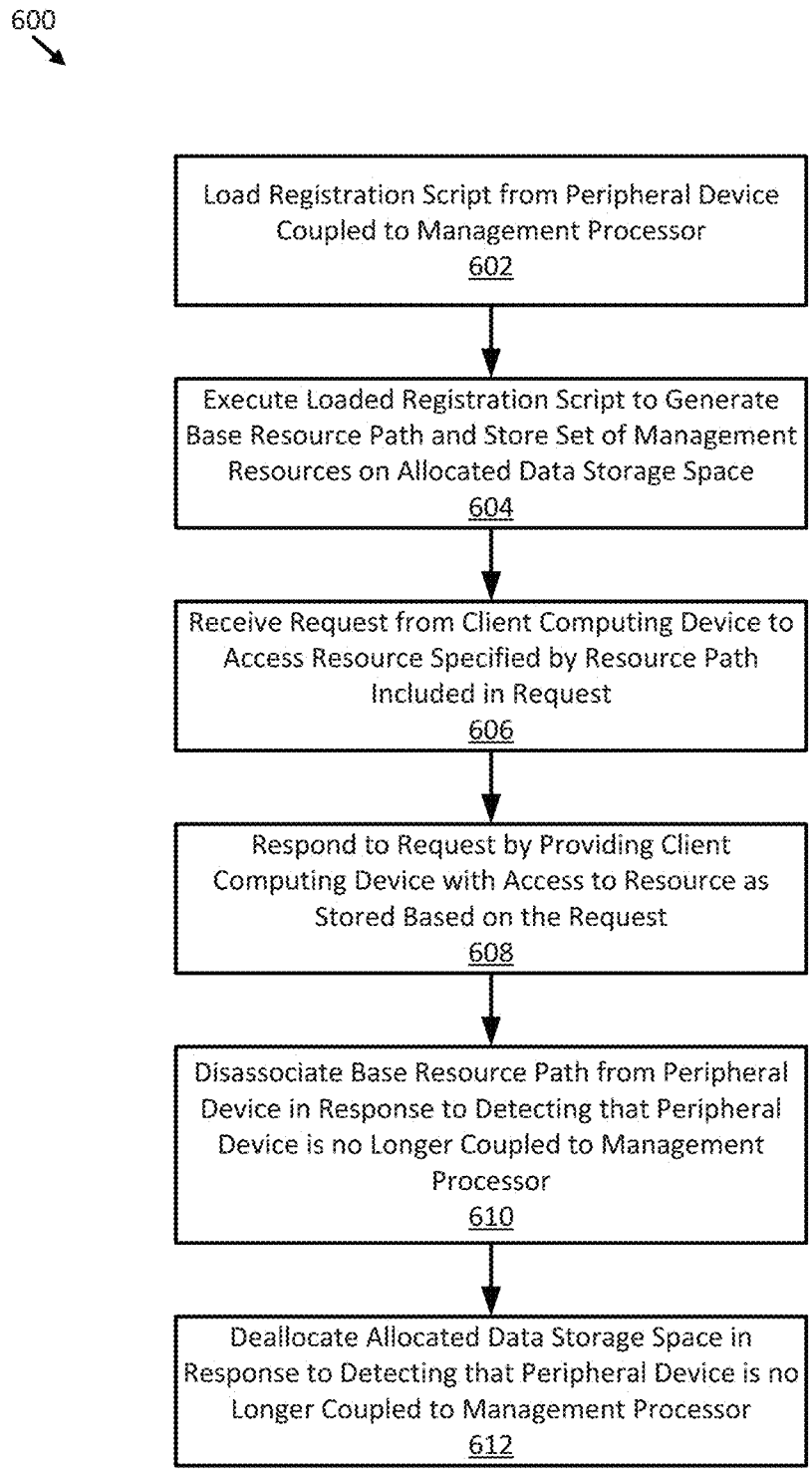

FIG. 6 is a flow diagram illustrating an example method 600 for registering a peripheral device to an example management processor according to the present disclosure. In particular, the method 600 may be performed by a management processor, such as the management processor 104 or a baseboard management controller (BMC) included by a computing device (e.g., server). In accordance with some examples, the method 600 facilitates registering the peripheral device 102 with the management processor 104 as a data provider. Although execution of the method 600 is described below with reference to the management processor 104 of FIG. 1, execution of the method 600 by other suitable systems or devices may be possible. The method 600 may be implemented in the form of executable instructions stored on a machine-readable medium (e.g., firmware) or in the form of electronic circuitry.

In FIG. 6, the method 600 may begin at block 602 and continue through block 604 through 608. For some examples, blocks 602, 604, 606, and 608 are similar to blocks 502, 504, 506, and 508 of the method 500 described above with respect to FIG. 5.

Subsequent to block 608, the method 600 may continue to block 610, with the management processor 104 disassociating the base resource path (e.g., generated at block 604) from the peripheral device. Additionally, subsequent to block 608, the method 600 may continue to block 612, with the management processor 104 deallocating the allocated data storage space (e.g., allocated at block 604).

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A management processor, comprising:
an execution environment to execute within the management processor a registration script imported from a peripheral device that is coupled to the management processor, wherein based on execution of the imported registration script, the management processor:
generates a base resource path in association with data storage space allocated for the peripheral device; and
stores, on the allocated data storage space, a set of management resources associated with and received from the peripheral device;
a management interface to receive, from a client computing device, a request to access a resource specified by a resource path included in the request, the resource path including the base resource path and an identifier for the resource being in the stored set of management resources;
an access engine to respond to the request by providing the client computing device with access to the resource as stored on the allocated data storage space corresponding to the resource path.

2. The management processor of claim 1, wherein the set of management resources comprises a link to a peripheral device management script associated with the peripheral device and executable in the execution environment.

3. The management processor of claim 1, wherein the set of management resources comprises at least one of: static management data associated with the peripheral device, or a management script associated with the peripheral device and executable in the execution environment.

4. The management processor of claim 1, wherein the management interface comprises a RESTful interface.

5. The management processor of claim 1, wherein the base resource path and the resource path comprise a Universal Resource Locator (URL).

6. The management processor of claim 1, wherein the base resource path uniquely identifies the peripheral device over another peripheral device.

7. The management processor of claim 1, wherein the allocated storage space is allocated exclusively to the peripheral device.

8. The management processor of claim 1, comprising a peripheral detector to detect whether the peripheral device is no longer coupled to the management processor and, in response, to cause the base resource path to be disassociated from the peripheral device.

9. The management processor of claim 1, comprising a peripheral detector to detect whether the peripheral device is no longer coupled to the management processor and, in response, to cause deallocation of the allocated data storage space.

10. The management processor of claim 1, wherein before a management script associated with the peripheral device is executed within the execution environment, the management processor validates communication from the management script to peripheral device against a unique identifier associated with the peripheral device.

11. The management processor of claim 10, wherein the management processor generates the unique identifier for the peripheral device based on a set of attributes of the peripheral device.

12. The management processor of claim 1, wherein before a management script associated with the peripheral device is permitted to access to data stored on the allocated data storage space, the management processor validates the management script based on the base resource path.

13. A computing device, comprising:
a central processor;
a management processor coupled to the central processor, the management processor including:
an execution environment to execute within the management processor a registration script imported from a peripheral device that is coupled to the management processor, wherein based on execution of the imported registration script, the management processor:
generates a base resource path in association with data storage space allocated for the peripheral device; and
stores, on the allocated data storage space, a set of management resources associated with and received from the peripheral device;
a management interface to receive, from a client computing device, a request to access a resource specified by a resource path included in the request, the resource path including the base resource path and an identifier for the resource being in the stored set of management resources;
an access engine to respond to the request by providing the client computing device with access to the resource as stored on the allocated data storage space corresponding to the resource path.

14. The computing device of claim 13, wherein the set of management resources comprises a link to a peripheral device management script associated with the peripheral device and executable in the execution environment.

15. The computing device of claim 13, wherein the set of management resources comprises at least one of: static management data associated with the peripheral device, or a management script associated with the peripheral device and executable in the execution environment.

16. The computing device of claim 13, wherein the management interface comprises a RESTful interface.

17. A method, comprising:
loading, by a management processor of a computing device, wherein the management processor is separate from a central processor used to operate an operating system of the computing device, a registration script from a peripheral device coupled to the management processor;
executing, by the management processor, the loaded registration script to cause the management processor to:
generate a base resource path in association with data storage space allocated for the peripheral device; and
store, on the allocated data storage space, a set of management resources associated with and received from the peripheral device;
receiving, from a client computing device, a request to access a resource specified by a resource path included in the request, the resource path including the base resource path and an identifier for the resource being in the stored set of management resources; and
in response to the request, the management processor providing the client computing device with access to the resource as stored on the allocated data storage space corresponding to the resource path.

18. The method of claim 17, wherein the request comprises a RESTful service request, and wherein the management processor generates the unique identifier for the peripheral device based on a set of attributes of the peripheral device.

19. The method of claim 17, in response to detecting that the peripheral device is no longer coupled to the management processor, the management processor disassociating the base resource path from the peripheral device.

20. The method of claim 17, in response to detecting that the peripheral device is no longer coupled to the management processor, the management processor deallocating the allocated data storage space.

* * * * *